(12) United States Patent
Jansen et al.

(10) Patent No.: US 11,303,194 B1
(45) Date of Patent: Apr. 12, 2022

(54) WOUND FIELD SYNCHRONOUS MACHINE (71) Applicant: United States of America as represented by the Administrator of NASA, Washington, DC (US)

(72) Inventors: Ralph H. Jansen, Westlake, OH (US); Peter E. Kascak, Grafton, OH (US); Rodger W. Dyson, Elyria, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 157 days.

(21) Appl. No.: 16/460,109

(22) Filed: Jul. 2, 2019

Related U.S. Application Data (60) Provisional application No. 62/694,081, filed on Jul. 5, 2018.

(51) Int. Cl.
| | | |
|---|---|---|
| *H02K 55/04* | (2006.01) | |
| *H02K 3/14* | (2006.01) | |
| *H02K 5/04* | (2006.01) | |
| *H02K 9/22* | (2006.01) | |
| *H02K 13/00* | (2006.01) | |
| *H02K 7/08* | (2006.01) | |

(52) U.S. Cl.
CPC .............. *H02K 55/04* (2013.01); *H02K 3/14* (2013.01); *H02K 5/04* (2013.01); *H02K 7/083* (2013.01); *H02K 9/22* (2013.01); *H02K 13/003* (2013.01); *H02K 2203/15* (2013.01); *H02K 2205/12* (2013.01)

(58) Field of Classification Search
CPC .......... H02K 55/04; H02K 55/00; H02K 3/14; H02K 3/12; H02K 5/04; H02K 7/083; H02K 9/22; H02K 9/19; H02K 9/193; H02K 9/197; H02K 13/003; H02K 2203/15; H02K 2205/12
USPC .......................................... 310/52, 54, 58, 59
See application file for complete search history.

(56) References Cited

U.S. PATENT DOCUMENTS

| | | | |
|---|---|---|---|
| 2009/0121561 A1* | 5/2009 | Gromoll ................ | H02K 55/04 310/52 |
| 2010/0277136 A1* | 11/2010 | Snitchler ................ | H02K 1/165 322/59 |
| 2012/0161557 A1* | 6/2012 | Mizutani ................ | H02K 55/04 310/64 |
| 2013/0165325 A1* | 6/2013 | Frank ..................... | F25B 39/00 505/163 |
| 2015/0229168 A1* | 8/2015 | Murase ................... | H02K 1/02 310/190 |
| 2019/0036438 A1* | 1/2019 | Murase ................... | H02K 9/19 |

\* cited by examiner

*Primary Examiner* — Michael Andrews
(74) *Attorney, Agent, or Firm* — Robert H. Earp, III; Mark Wolfgang; Helen M. Galus (57) ABSTRACT

A cryogen-free partially-superconducting electric machine of the wound field synchronous type includes a room temperature semi-slotless stator, a superconducting motor rotor, a gap between the rotor and stator, a torque tube which isolates the cryogenic superconducting motor rotor from a central shaft, bearings, an acoustic cryocooler integrated within the motor rotor and torque tube, a heat exchange, a rotary transformer, a vacuum pump, a vacuum enclosure integrated with the stator, and an eddy current/thermal shield. The electric machine can act as a motor or a generator and produces a high specific power and efficiency.

19 Claims, 6 Drawing Sheets

FIG. 9

WOUND FIELD SYNCHRONOUS MACHINE

CROSS REFERENCE TO RELATED APPLICATION

This application claims priority to U.S. Provisional Patent Application Ser. No. 62/694,081 filed Jul. 5, 2018, which is expressly incorporated herein by reference.

ORIGIN OF THE INVENTION

The invention described herein was made by employees of the United States Government and may be manufactured and used by or for the Government for Government purposes without the payment of any royalties thereon or therefore.

BACKGROUND

The aeronautics industry has been challenged on many fronts to increase efficiency, reduce emissions, and decrease dependency on carbon-based fuels. Electrification of aviation propulsion through turboelectric or hybrid electric propulsion has the potential to revolutionize the aviation industry. Previous studies have shown that the weight and efficiency of the power system should move beyond the current state of the art to reduce fuel burn on the aircraft.

In this regard, typical electric machines have to balance specific power and efficiency. However, both are crucial for a successful design of an electric machine. Superconducting electric machines have the potential to simultaneously achieve high specific power and efficiency goals. This is because superconducting electric machines utilize superconducting wires, which provide a much higher air gap field capability compared to permanent magnets, typical wound field conductors, or an induction motor. Employing superconducting coils can provide a dramatic improvement in the magnetic field generated because the direct current resistance is zero in the superconductor at the correct operating conditions. However, superconducting machines have been limited because superconductors require cryogenic temperatures to operate, which typically requires a separate cryogenic fluid cooling system, which adds mass, volume, and complexity to the overall system. Such additional requirements for cooling the superconducting wires often prevents their use in many applications.

BRIEF DESCRIPTION

According to one aspect, an electric machine includes a stator; a rotor including rotor windings; an air gap arranged between the stator and the rotor and allowing rotation of the rotor with respect to the stator; and a cryocooler integrated with the rotor and adapted for co-rotation with the rotor. A cold end of the cryocooler is in thermal contact with the rotor to cool the rotor windings to cryogenic temperatures to thereby make the rotor windings superconductive. The electric machine is not cooled by cryogenic fluids, and the stator is not cryogenically cooled.

According to another aspect, an electric machine includes a stator including multiphase stator windings; a rotor rotatable with respect to the stator and including rotor windings; and a cryocooler integrated with the rotor and adapted for co-rotation with the rotor. The cryocooler is capable of lifting a predetermined amount of heat loss in the rotor so as to cool the rotor windings to cryogenic temperatures and make the rotor windings superconductive. The multiphase stator windings may have more than three phases, and when combined with the proper electrical control technology, thus limits the heat loss in the rotor to be less than the predetermined amount of heat loss. The electric machine is not cooled by an associated cryogenic fluid.

DETAILED DESCRIPTION

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-9 illustrate an exemplary cryogen-free partially-superconducting electric machine 2 of the wound field synchronous type that can act as a motor or a generator. By "cryogen-free", it is meant that the electric machine 2 does not utilize cryogenic fluids or cryogenic systems that circulate cryogenic fluids to cool the electric machine 2.

The electric machine 2 includes a room-temperature semi-slotless stator 4, a cryogenic superconducting motor rotor 6, and an air gap 8 between the rotor 6 and stator 4 that allows rotation of the rotor 6 with respect to the stator 4. A torque tube 10 is connected to the rotor 6 for co-rotation therewith, and isolates the rotor 6 from a central shaft 12. Bearings 14 rotatably connect the central shaft 12 to the shaft housing 13. The electric machine 2 further includes an acoustic cryocooler 16 integrated with the rotor 6, torque tube 10, and the central shaft 12 for co-rotation with the rotor 6. A fixed thermal bridge 18 is provided between the cryocooler 16 and the rotor 6. The exemplary electric machine 2 further includes a rotary transformer 20 or slip ring (not shown), a vacuum enclosure 22 integrated with the stator 4 and surrounding the rotor 6, a vacuum pump (not shown), an eddy current/thermal shield (which may be incorporated into or as part of the vacuum enclosure 22) around the rotor 6, and a heat exchanger 32.

As depicted, the rotor 6 includes superconducting rotor windings 28. The cryocooler 16 is incorporated in the machine 2 itself, where a cold tip 30 (also referred to as "cold end") of the cryocooler 16 is in thermal contact with the rotor windings 28 via the fixed thermal bridge 18, thereby eliminating the need for any external cryogenic equipment or any associated cryogenic fluids for cooling the rotor windings 28. Accordingly, the cryogen-free partially-superconducting electric machine 2 uses a combination of superconducting and non-superconducting elements and the integrated acoustic cryocooler 16 to achieve many of the benefits of known superconducting motors, but without the need for a separate cryogenic system utilizing cryogenic fluids.

The combination of the self-cooled superconducting rotor 6 with the semi-slotless stator 4 also allows the electric machine 2 to achieve exceptional specific power and efficiency without incurring added weight that is typically associated with an external cryogenic cooling apparatus that uses cryogenic liquids included in typical superconducting machines. It should be appreciated that when viewed as a black box, the electric machine 2 as a whole operates like any traditional non-superconducting motor, and thus for a system integrator, the electric machine 2 has the appearance and output similar to a traditional non-superconducting motor. However, the electric machine 2 includes the superconductor rotor windings 28 on the rotor 6 to create a strong magnetic field through the air gap 8 that enables specific power and efficiency performance that may not be achieved using typical conductors or permanent magnets in the rotor. By way of example, the exemplary electric machine 2 may have the potential to operate at 1 MW with specific power approximately greater than 16.0 kW/kg and an efficiency approximately greater than 99%.

Further, the exemplary configuration of the superconducting rotor 6 and the normal-operating-temperature stator 4 provides balanced performance. And unlike permanent magnet electric machines, the synchronous wound field allows the electric machine 2 to be shut down by de-energizing the rotor windings 28, where de-energizing removes force from the drive shaft without the need for mechanical decoupling. In this case, the exemplary stator 4 of the electric machine 2 is "room temperature", meaning it is designed to use a typical fluid or air cooling loop and is not cooled to cryogenic temperatures. The cooling loop for the stator 4 may be a dielectric oil with an input temperature of 60° C.

Figure 1:
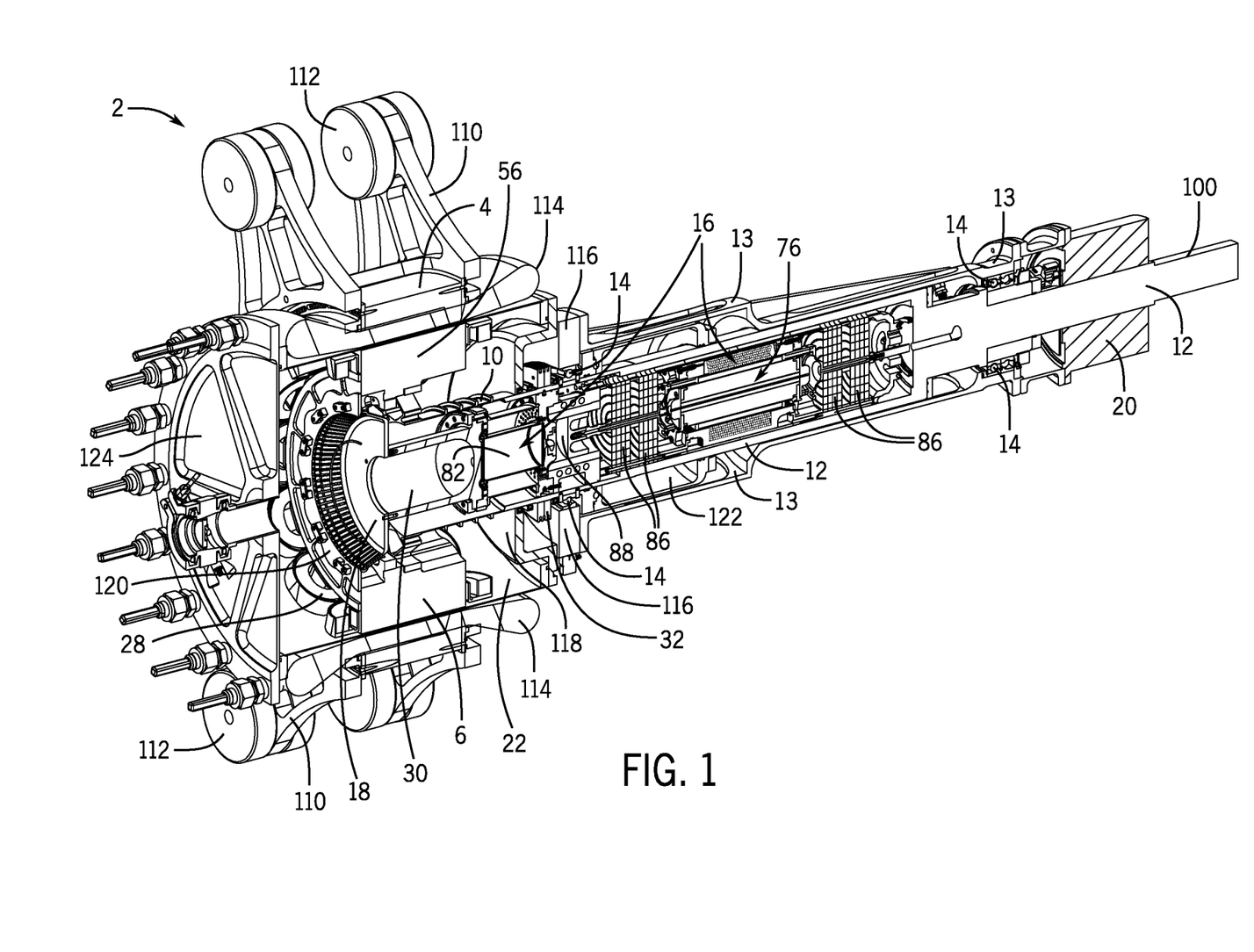
FIG. 1 is a perspective cross-sectional view of an electric machine according to the present subject matter.

With reference to FIG. 1, the central shaft 12 may support parts of the vacuum pump, the cryocooler 16, and the rotary transformer 20. The bearings 14 may be arranged at each end of the central shaft 12 to allow the rotor 6 to rotate with respect the central shaft 12, which is stationary with respect to the stator 4. The bearings 14 may consist of individual bearings, angular contact bearings sets, or other types of bearings. The bearings 14 may operate at room temperature and be thermally insulated from the rotor 6. This allows the use of standard bearings with longer life and easier maintenance than cryogenic bearings. The vacuum pump may be arranged on the warm part of the central shaft 12 near the bearings 14. It should be appreciated that the vacuum pump may allow the electric machine 2 to self-pump the vacuum enclosure 22 so that an external vacuum pump is not required. A self-pumping system may be most appropriate for many applications; however, an external vacuum pump may be an alternate configuration for some applications. The rotary transformer 20 is in electrical contact with the torque tube 10 for transferring electrical power to the rotor windings 28 to energize the rotor windings 28, or for transferring electrical power from the rotor windings 28 to pull power from the rotor windings 28. With the use of the rotary transformer 20, there is no mechanical electrical contacts between the stationary and rotating parts of the electric machine 2.

The rotary transformer 20 may be located at the warm end of the central shaft 12, which may reduce thermal and mechanical stress, or at the rotor 6, which however may be a higher mechanical and thermal stress location. The benefit of locating the rotary transformer in the cryogenic region at the rotor 6, is that the field windings of the rotary transformer 20 will have no thermal connection to a warm component, thereby reducing heat leak. An alternate configuration may include the use of slip rings, which are a mature technology that does not require electronics on the rotor 6. With this alternative arrangement, the slip rings would be located at the warm end of the central shaft 12.

An eddy current/thermal shield may be incorporated on the internal diameter of the stator 4, such as part of or on the vacuum enclosure 22, to reduce the eddy currents in stator windings 38 and reduce radiation heat transfer between the stator 4 and the rotor 6. In order to minimize losses in the rotor windings 28, higher frequency harmonics of the rotor windings 28 may be dissipated by the eddy current/thermal shield, which can also be used to reduce radiation heat transfer between the stator 4 and the rotor 6 by using a low emissivity material. The eddy current/thermal shield may include polished copper or a similar material.

Exemplary non-limiting parameters for the electric machine 2 are shown in Table 1.

TABLE 1

| Electric Machine Parameters | |
|---|---|
| Parameter | Value |
| Machine type | Wound field synchronous |
| Rated Power | 1.4 MW |
| Rated Speed | 6800 RPM |
| Rated Voltage | 1200 V |
| Rated Current | 360 A |
| Poles | 12 |
| Phases | 9 |

As indicated previously, the cryocooler 16 is integrated inside the torque tube 10 for rotation therewith. According to the present disclosure, the cold tip or end 30 of the cryocooler 16 may be at 50K and may be able to lift 50 W of heat from the rotor windings 28 and reject to a 300K ambient environment. It should be appreciated that to integrate the cryocooler 16 inside the torque tube 10, the cryocooler 16 is designed to be light weight (e.g., approximately less than 10 kg), have a small diameter (e.g., approximately less than 100 mm), and be able to withstand 6800 rotations per minute (RPM) about its central axis. As a result of the incorporation of the operational components within the electric machine 2, rather than as external components to the electric machine 2, the electric machine 2 may be able to interface with, for example, an aircraft in the same way as any typical motor/generator, but while avoiding the additional mass, volume, and infrastructure which would be required with traditional superconducting machines.

The exemplary features of the electric machine 2 will now be described in greater detail.

Stator

Figure 6:
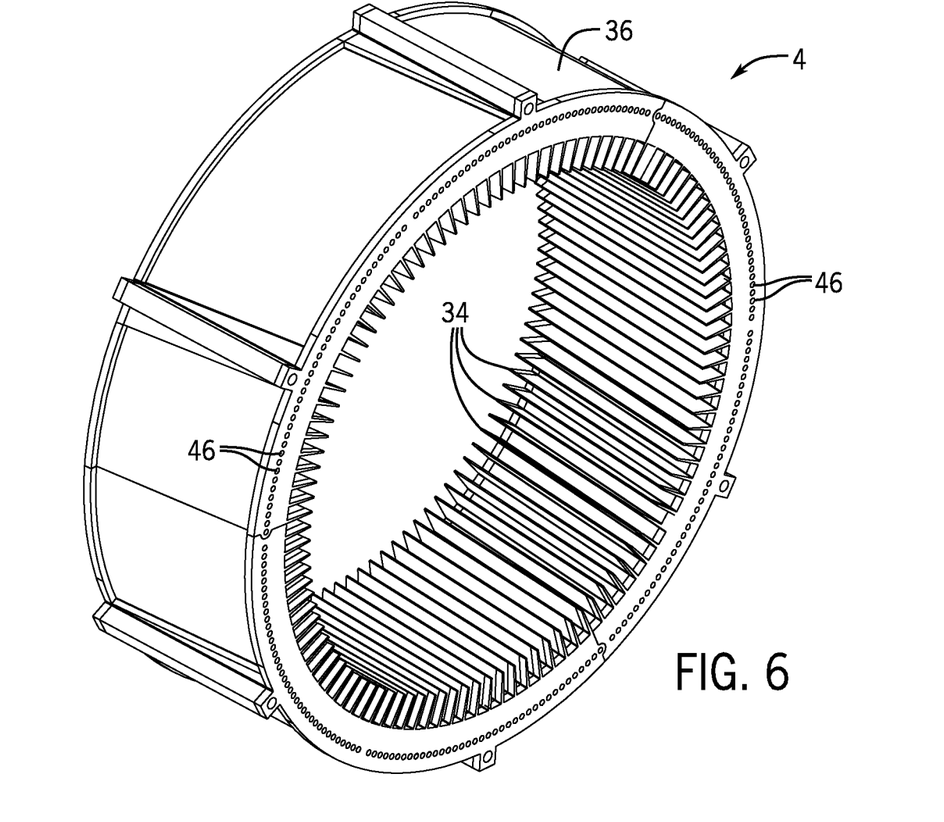
FIG. 6 is a perspective view of a stator backiron according to the present subject matter.
Figure 7:
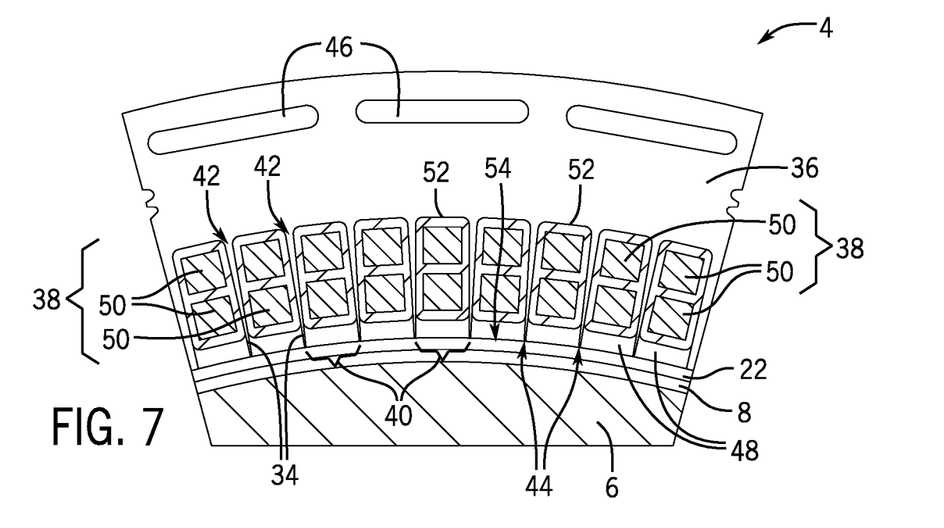
FIG. 7 is a partial cross-sectional view of a stator and rotor according to the present subject matter.

With reference to FIGS. 6 and 7, the stator 4 of the electric machine 2 is configured as a semi-slotless stator, so called because of the size and shape of its teeth 34. The stator windings 38 are included and arranged in stator winding slots 40 defined between the teeth 34. The stator windings 38 may include a single or double turn of litz wire. Further depicted, the teeth 34 extend radially inward from a stator backiron 36 toward the rotor 6 and are spaced from one another to define stator winding slots 40. According to one aspect, a cross-sectional width of each of the teeth 34 may continually decrease from a base 42 of each of the teeth 34 near the stator backiron 36 to a tip 44 of each of the teeth 34 near the rotor 6, such that for each of the teeth 34 a width of the tip 44 may be smaller than a width of the base 42. It should be appreciated that because the teeth 34 are relatively thin and may have a tapered shape, the teeth 34 may not serve a significant role electromagnetically. However, the teeth 34 provide a heat removal path from the stator windings 38 to the stator backiron 36, and also provide a physical constraint for the stator windings 38 against sheer and other stresses.

According to the present disclosure, the stator windings 38 may include copper or aluminum and are not superconductive, and thus do not need to be cryogenically cooled. The stator 4 includes a circulation path that allows for a cooling fluid to be circulated around the stator windings 38 near the tips 44 of the teeth 34 and near the air gap 8. This circulation path allows for the cooling fluid to directly cool the inside diameter of the stator windings 38, and may allow the temperature at the inside diameter of the stator windings 38 to be below about 60° C. in order to reduce heat radiation towards the cryogenically cooled rotor 6. As compared to a conventional cooling loop, where the inside diameter of the stator windings are not directly cooled by the cooling fluid, the stator windings cooled by a conventional cooling loop may have a higher temperature (e.g. greater than 60° C.) than in the current configuration.

As depicted in FIGS. 6 and 7, the stator backiron 36 includes bores 46 formed therein, and a space 48 exists in each of the stator winding slots 40 between the stator windings 38 and the vacuum enclosure 22. The bores 46 may have any cross-sectional shape and be of any number. By way of example, one or more circle-shaped bores 46 (FIG. 6) may be provided for each stator winding slot 40, a single spherocylinder-shaped bore 46 (FIG. 7) may be provided for a plurality of stator winding slots 40, or other numbers and shapes of bores 46 may be provided. At least one of the bores 46 is in fluid communication with the space 48 in each of the stator winding slots 40 to thereby define the circulation path, which again is configured to transport the cooling fluid for cooling the stator windings 38. The circulation path may allow the cooling fluid to enter the stator 4 and flow through the spaces 48 to directly cool the stator windings 38, and then flow through the bores 46 and exit the stator 4. More particularly, a circulation path is provided which circulates cooling fluid from a manifold, and is circulated starting at the radial inner surface at front ends of the rotor windings 28 (i.e. front end-windings), across the length of the air gap 8 and through the spaces 48 of the stator winding slots 40, around back ends of the rotor windings 28 (back end-windings), back through the series of bores 46 in the stator backiron 36, and finally across the radial outer surface of the front ends of the rotor windings 28.

As indicated previously, the stator windings 38 may include litz wire, which includes twisted bundles of thousands of very fine individually insulated wires, which are commercially available and typically used in high performance, alternating current applications to reduce eddy current losses and for efficient high power density motors. Since the electric machine 2 uses superconductor rotor windings 28, it is possible to achieve a high air gap magnetic field. However, as a consequence the stator windings 38 are exposed to a high fluctuating field, which is accommodated by the use of litz wire to minimize eddy current losses in the stator windings 38. In order to keep the output voltage of the electric machine 2 under approximately 1200V, a single or double turn of litz wire may be used as the stator windings 38. The litz wire of the stator windings 38 may include a plurality of twisted conductive wires that define a cord, where each of the conductive wires in the cord are electrically insulated from one another. A plurality (e.g., at least four) of cords may be arranged together to thereby define a cable 50, where an outside of each of the cords is electrically insulated from the other cords. Each of the stator winding slots 40 may include two cables as depicted in FIG. 7, with electrical insulation 52 on the outside of each cable 50 so that each cable 50 of litz wire is electrically insulated from the other cable 50. As depicted in FIG. 7, the two cables 50 and insulation 52 may not occupy the entirety of the stator winding slots 40, thus leaving the space 48 for circulating the cooling fluid around the stator windings 38, as described above.

The plurality of twisted conductive wires in the litz wire may be 100 micrometer or smaller wires, each with an isolative coating. At its thinnest, the isolative coating may be approximately 5 micrometers for a single build and approximately 10 micrometers for a double build, and may consist of a polyimide with thermal conductivity of approximately 0.1 W/m-K, which surrounds the copper wire with a thermal conductivity of approximately 385 W/m-K. While the isolative coating has a relatively small thickness and large surface area, it is distributed throughout the entire volume of the litz wire cables 50. In terms of cross-sectional area of the cables 50 (neglecting the high voltage insulation around the cables 50), the copper wire may occupy 40%-70% of the cross-sectional area depending on the build (e.g., how the wires are twisted together), while the isolative coating may occupy roughly 10% of the volume, depending on the build. The remainder of the area may be filled with potting material.

The stator windings 38 may be multiphase stator windings, which in general have more than 3 phases, and can thus produce magnetomotive forces (MMFs) with fewer harmonics than traditional 3 phase windings. With fewer harmonics, lower losses can be produced on a rotor driven by a multiphase stator. In the present example, the stator 4 may include a nine-phase configuration to minimize the harmonic content, and yield a slight performance benefit compared to a three phase machine. However, other phase numbers may be used. Considering the combination of the multiphase (greater than 3) stator windings 38 and the pulse tube cryocooler 16, the use of multiphase stator windings 38 lowers the rotor 6 losses sufficiently for the pulse tube cryocooler 16 to be able to cool the rotor windings 28 to cryogenic temperature. Where the stator 4 has nine phases, the rotor losses may be 50 W, which may be the heat lift limit of the cryocooler 16.

Figure 2:
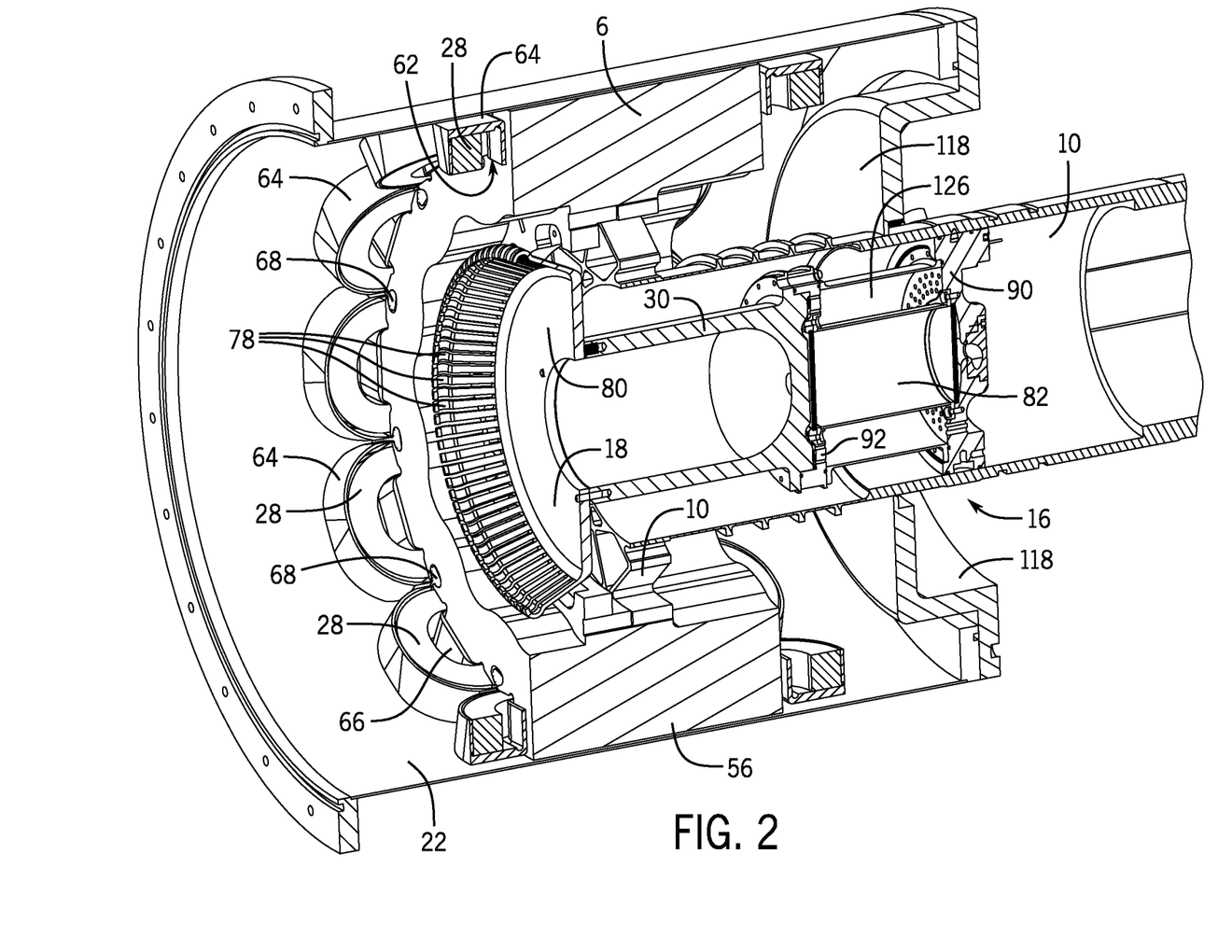
FIG. 2 is a perspective cross-sectional view of a detailed portion of the electric machine of FIG. 1.
Figure 3:
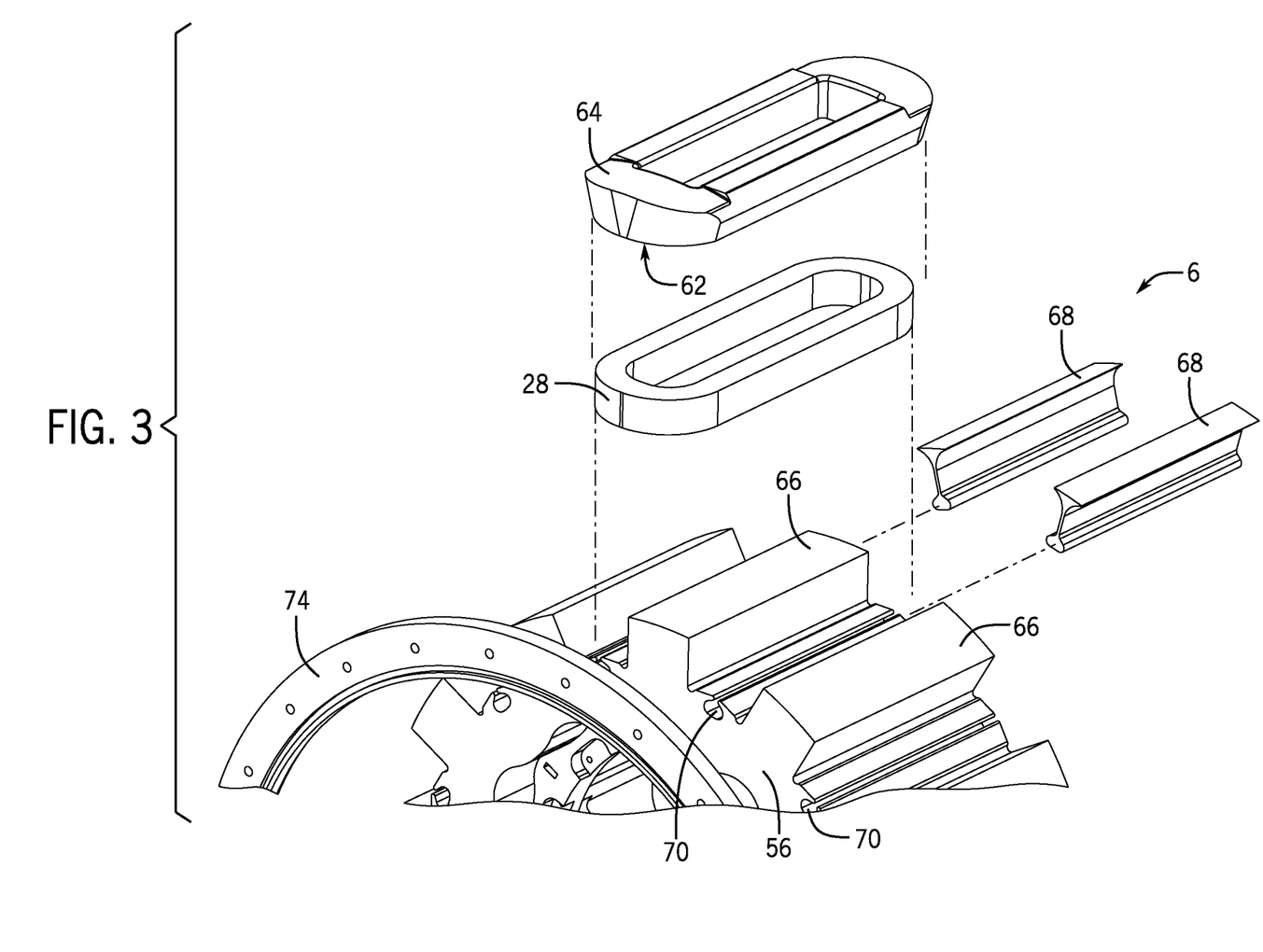
FIG. 3 is a partial perspective exploded view of a rotor according to the present subject matter.

With reference to FIGS. 1, 2 and 7, the vacuum enclosure 22 is arranged between the stator windings 38 and the rotor windings 28, and is arranged around the rotor 6. A vacuum is generated inside the vacuum enclosure 22 to keep the atmosphere inside the vacuum enclosure 22 and within which the rotor 6 resides, below average atmospheric pressure (i.e. less than 1 bar). The vacuum generated inside the vacuum enclosure 22 allows the rotor 6 to rotate with less wind resistance, thus increasing the efficiency of the electric machine 2. This arrangement of the vacuum enclosure 22 between the stator 4 and the rotor 6 may result in a fairly large distance between the stator windings 38 and the rotor windings 28. Although this large distance could impact performance of the electric machine 2, such disadvantage may not be as significant as it would be in a machine with non-superconducting field windings, because the electric machine 2 uses the superconducting rotor windings 28, which enables a very high number of amp-turns in a small rotor winding 28 without resistive loss.

In FIG. 7, the vacuum enclosure 22 may define a radial inner surface 54 of the spaces 48 for the circulation path. The vacuum enclosure 22 may include a cooling jacket that runs through the air gap. The vacuum enclosure 22 may be a thin-walled composite tube arranged radially inside of the stator 4, and optionally as part of the stator 4. The vacuum enclosure 22 maintains a reduced pressure around the superconducting motor rotor 6, thermally isolates the rotor 6 from other normal-temperature components of the electric machine 2, and dramatically reduces windage drag losses during rotation of the rotor 6 because of the reduced pressure atmosphere in the vacuum enclosure 22.

Exemplary non-limiting parameters for the stator 4 are shown in Table 2.

TABLE 2

Stator Parameters

| Parameter | Value |
|---|---|
| Type | Semi slotless |
| Backiron | |
| Inner Diameter | 306 mm |
| Outer Diameter | 377 mm |
| Lamination Stack Height | 125 mm |
| Slots | 108 |
| Slot Width | 8 mm |
| Slot Depth | 19.5 mm |
| Skew | 3.33 degrees |
| Cooling Channel | 3.5 mm |
| Windings | |
| Number of Phases | 9 |
| Layout | Lap, 2 Layer, Over/Under |
| Number of Turns | 1 |
| Litz Wire | 8x8 mm, 6000 strands x 40AWG |
| Coil Slot Span | 9 |
| Phase/Group Offset | 6/2 |

Rotor

With reference to FIGS. 2-5, the rotor 6 may include a twelve pole, unlaminated, cobalt-iron rotor backiron 56 including rotor teeth 66 that are each wound with the superconducting rotor windings 28. The rotor windings 28 may be direct current (DC) windings, meaning that the rotor windings 28 are excited with only a DC current. The rotor windings 28 may be formed by winding of a superconducting ribbon, and thus may have a negligible amount of internal energy loss and can thus produce magnetic field strengths that greatly exceed those produced by conventional conductors or permanent magnets.

The use of a superconducting ribbon to create a high field strength without conduction losses, greatly improves the performance of the electric machine 2 relative to a system that uses non-superconducting windings. The inventors have found that one challenge in designing the rotor windings 28 is to minimize mechanical stress and fatigue of the superconducting ribbon, while maintaining a good electromagnetic circuit and conductive cooling path. Additional factors that limit the maximum current allowed in the superconductor rotor windings 28 are the operating temperature and field that the superconducting ribbon is exposed to. The density used in the design of the rotor windings 28 may be adjusted to include the impact of these two factors.

The rotor windings 28 design risks are minimized by limiting the surface speed of the rotor 6, and by using a relatively mature superconductor-based composite ribbon. The surface speed of the rotor 6 may be approximately 100 m/s, which is one third to one half the surface speed of many known high specific power motor designs. This lower surface speed and corresponding lower rotor speed provides an additional benefit, as it allows the electric machine 2 to be directly coupled without the need for a gearbox, to a turbofan (when utilized as a generator) or to a propulsion device, i.e., a fan or propeller (when used as a motor).

Rare-Earth barium copper oxide (REBCO) type superconductors, such as yttrium barium copper oxide, may be used for the rotor windings 28 because such superconductors have a relatively high superconducting temperature (approximately 92K critical temp), and are commercially available as ribbon in lengths of several hundred meters. This length allows for producing rotor windings 28 using a single piece of ribbon. Commercially available REBCO composite ribbons may be suitable for use in the rotor windings 28 because the stability of these ribbons may withstand the environment of the present application, which includes temperature variations, a cyclic magnetic field, and a cyclic multi-axial mechanical stress.

A conventional non-superconducting rotor winding requires that each turn of wire in the winding is electrically insulated from the other turns. This limitation does not apply to most superconducting coils that carry DC currents, or AC currents of sufficiently low frequency. Thus, even without turn-to-turn insulation, the applied current prefers to flow in the turns of superconductor rotor windings 28 rather than between two adjacent turns through the superconductor's resistive sheath. Because of this, the rotor windings 28 may be prepared using no insulation superconducting ribbon. Compared to insulated superconducting windings, no insulation (NI) superconducting windings have several benefits, including higher engineering current density (or smaller size), better mechanical strength, fault tolerance (immunity to quench, i.e., a loss of superconductivity), and resistance to conductor defects.

Additionally, NI superconducting windings may allow the applied current to flow around a quenched zone (i.e., a zone in the superconductor rotor windings 28 that experiences a loss of superconductivity as a result of excessive temperature, magnetic flux density, or conduction current) in the superconductor rotor windings 28, and may provide higher engineering current density, better mechanical strength, and resistance to defects in the rotor windings 28. The use of NI superconductor rotor windings 28 may allow the superconductor's thickness to be reduced to 65 μm (from the typical 100 μm), which may enable the rotor windings 28 to have an approximately 54% higher magnetomotive force (MMF).

The NI superconducting ribbon may be a layered structure including an inner substrate layer, with an epitaxial REBCO HTS layer arranged thereon, two layers of silver overlay on either side thereof, followed by two copper outer layers arranged on either side of the silver layers. A suitable superconducting ribbon is available under the tradename of SuperPower® 2G HTS wire, and is available from Superpower Inc. of Schenectady, N.Y., USA. The NI superconducting ribbon may be rolled into a superconducting coil 58, and a plurality (e.g., four) of coils 58 may be stacked and bonded together with epoxy and a plate 60 (e.g., made of steel or plastic) between adjacent coils 58, to thereby form a rotor winding 28. Each of the superconducting coils 58 can be electrically connected to the adjacent superconducting coils in the rotor windings 28 using soldered HTS ribbon as a jumper between adjacent layers. Each coil 58 can have from 200-300 turns of the superconducting ribbon, or more or less.

Superconducting ribbon used to the make the rotor windings 28 may be fragile compared to copper and aluminum wire, and thus superconducting ribbon may be subject to maximum strain and minimum bend radius constraints, and care may be required to be taken to avoid appreciable shear stresses or excessive tensile stresses. These mechanical constraints may be considered for the superconducting rotor windings 28, which may be subjected to significant centrifugal loads, in addition to the typical thermal and electromagnetic forces during operation of the electric machine 2. Although a tip speed of the rotor 6 may be relatively low (e.g., approximately 107 m/s), the centrifugal force imposed on each rotor winding 28 may still be significant considering that superconducting ribbon may be much more fragile than copper wire, and considering space for a containment structure for the rotor windings 28 may be limited (i.e., the pole count is fairly high). As a result, the rotor windings 28 are designed and constructed so that the centrifugal force imposed on the rotor windings 28 is readily transferred to a containment structure.

Figure 4:
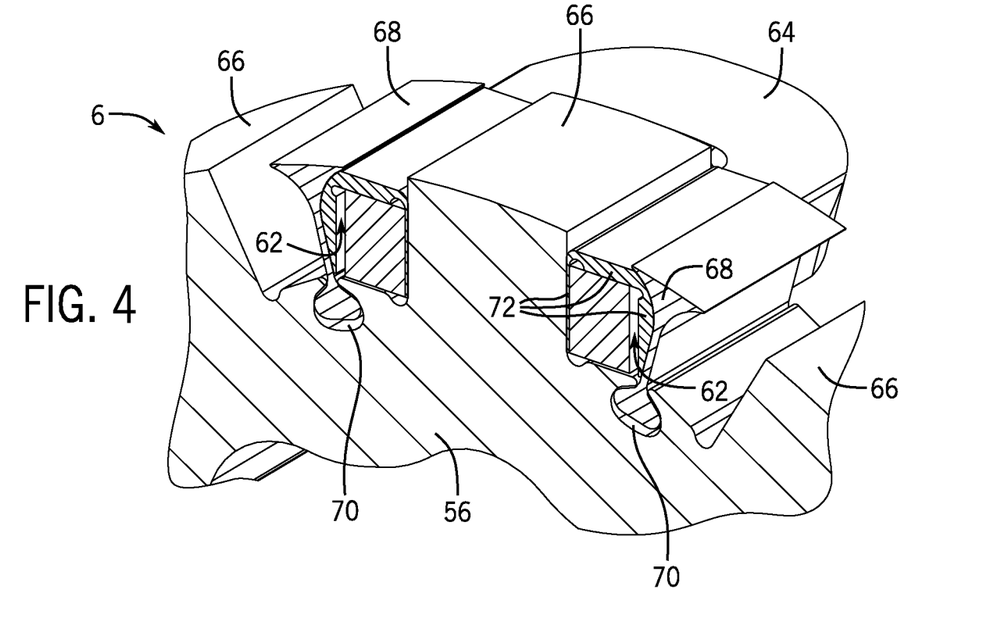
FIG. 4 is a partial perspective cross-sectional view of a rotor according to the present subject matter.
Figure 5:
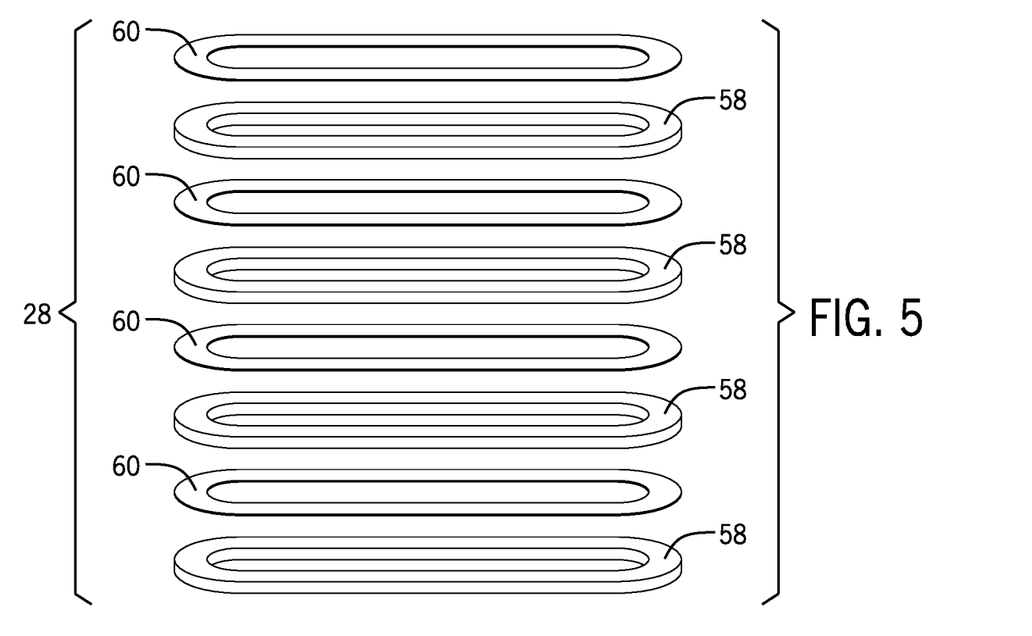
FIG. 5 is a perspective exploded view of a rotor winding according to the present subject matter.

Due to these mechanical constraints for the superconducting ribbon, the rotor windings 28 may be arranged in a groove 62 of a rotor winding fixture 64 as a containment structure for the rotor windings 28. The rotor winding fixture 64 may be annular-shaped or spherocylinder-shaped and include three walls 72 that define the groove 62 (see FIGS. 3 and 4). The fixture 64 may aid in allowing the rotor windings 28 to retain their annular or spherocylindrical shape during use in the electric machine 2. The rotor windings 28 are each arranged around one of the rotor teeth 66, and may be retained thereon by two dovetail retainers 68 arranged on either side of the fixture 64. Other shapes may be used for the retainers 68. The dovetail retainers 68 may slide into dovetail slots 70 on the rotor backiron 56. As will be understood, another two rotor windings 28 in rotor winding fixtures 64 may be retained by the dovetail retainers 68 that are depicted in FIG. 4, on the opposite sides from the depicted rotor winding 28 and rotor winding fixture 64. A ring retainer 74 may be arranged on opposite ends of the rotor windings 28 (one shown in FIG. 3) to further secure the rotor windings 28 on the rotor backiron 56 and around the rotor teeth 66.

Due to the relatively high number of rotor poles and the desire to maximize the flux density produced by the rotor 6, the rotor windings 28 may have a high number of turns and their minimum bend radius may be at a limit specified by the manufacturer of the superconducting ribbon.

The rotor windings 28 are conductively cooled by the cryocooler 16, which may have an approximately 50K cold tip or end 30. This 50K temperature of the cold tip 30 is only approximately 13K less than a possible max operating temperature of the HTS rotor windings 28 at 63K. Because of this limited operating temperature range of the rotor windings 28, heat input to the rotor 6 may be minimized, especially in or near the rotor windings 28, by the use of the vacuum enclosure 22, the cooling fluid circulation path in the stator 4, and other strategies as described herein.

Exemplary non-limiting parameters for the rotor 6 are shown in Table 3.

TABLE 3

Rotor Parameters

| Parameter | Value |
| --- | --- |
| Type | dc wound field Iron |
| Inner Diameter | between 189.4 to 200mm |
| Outer Diameter | 300 mm |
| Length | 125 mm |
| Number of Poles | 12 |
| Tooth Width | 34 mm |
| Coil | |
| Rated Current | 51.5 A |
| Number of Turns | 916 turns per pole |
| Coil Cross Section | 14.9 mm wide x 16.75 mm tall |
| Operating condition | 62.8K temperature, 2T field |
| Conductor | YBCO superconductor 4 mm x 0.65 mm |

Exemplary non-limiting parameters for the rotor windings 28 are shown below in Table 4.

TABLE 4

Rotor Winding Parameters

| Characteristic/parameter | Value |
| --- | --- |
| Superconductor | 2nd generation REBCO HTS |
| Insulation | none |
| Expected critical current (at 77K, self field) | 150 A |
| Max. magnetic flux density in the superconductor | 2 T |
| Operating temperature | 62.8K |
| Operating current | 51.5 A |
| Superconductor width | 4 mm |
| Superconductor thickness | 65 μm |
| Min. superconductor bend radius | 15 mm |
| Number of layers per coil | 4 |
| Number of turns per layer | 230 |

Cryocooler

The electric machine 2 utilizes an embedded thermal energy conversion single-stage pulse-tube cryocooler 16 to provide cryogenic cooling only to the rotor 6. The cryocooler 16 is used to lower the temperature of the rotor windings 28 to cryogenic levels enabling superconducting capability for the rotor windings 28. A heat path may extend from the rotor 6 to the heat exchanger 32. This cooling and use of the superconducting rotor windings 28 may provide a very high specific power output at relatively low rotational speeds for the electric machine 2. As such, the electric machine 2 may support the direct drive of propulsors and may have minimal thermal management requirements.

As shown in FIG. 1, the cryocooler 16 is arranged inside the rotor 6, and specifically inside the torque tube 10 that rotates in conjunction with the rotor 6. As such, rotation of the rotor 6 produces rotation of the torque tube 10 and cryocooler 16. The torque tube 10 may operate to thermally insulate the rotor 6 from the outside environment including from the central shaft 12. This insulation of the rotor 6 by the torque tube 10 may be combined with insulation of the rotor 6 by the vacuum enclosure 22, the rotary transformer 20, and the eddy current/thermal shield to keep the rotor windings 28 at cryogenic temperatures. The torque tube 10 may reduce conducted heat transfer by the use of a thin wall material for the torque tube 10, which configuration increases structural integrity while minimizing conductive heat paths.

Figure 8:
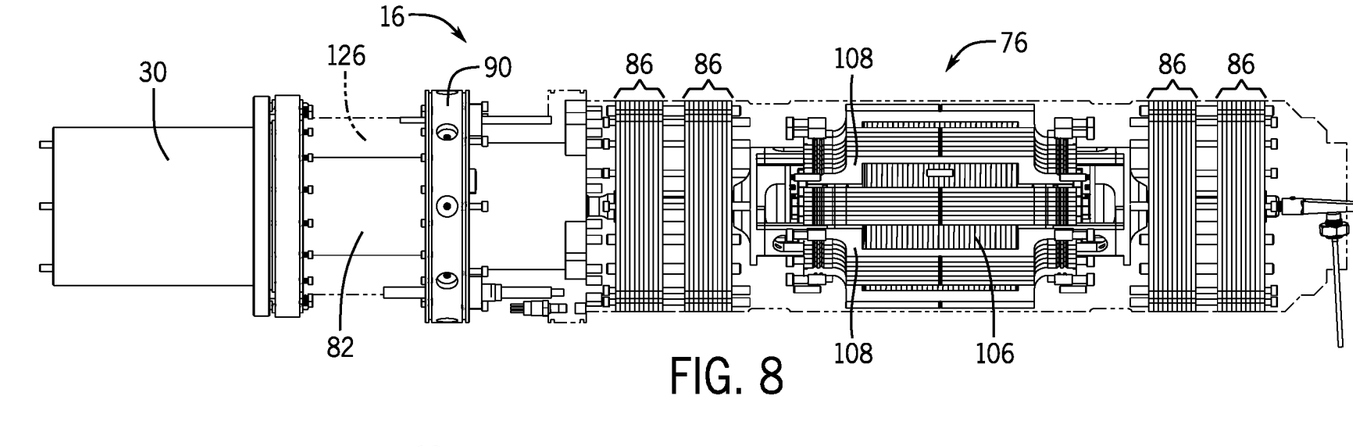
FIG. 8 is a side view of a cryocooler according to the present subject matter.
Figure 9:
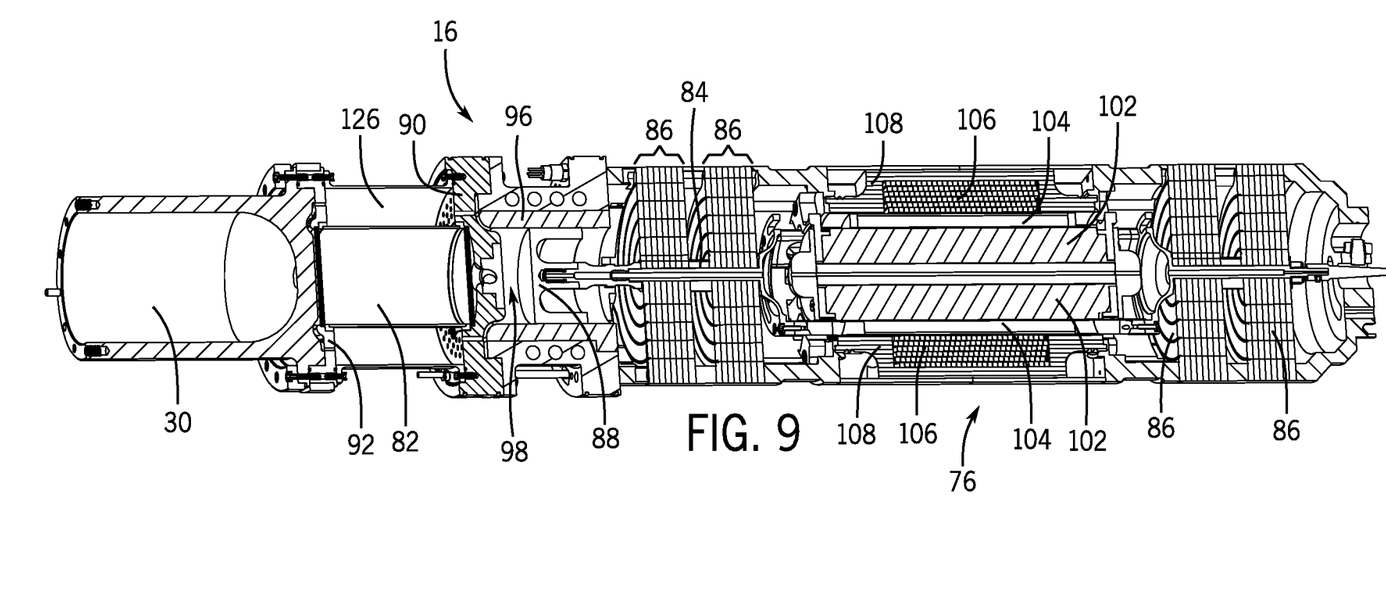
FIG. 9 is a cross-sectional view of the cryocooler of FIG. 8.

Views of the cryocooler 16 are shown in FIGS. 8 and 9. The cryocooler 16 may operate to lift approximately 50 W of heat energy from the rotor 6 when operating to have a cold tip 30 at approximately 50K. The cryocooler 16 can operate while it is rotating at a relatively low surface speed and fitting within the torque tube 10. The cryocooler 16 includes a long and narrow (i.e. high aspect ratio) Redlich style linear electric motor 76 integrated into the cryocooler 16, and the linear electric motor 76 may be capable of providing approximately 2000 W of mechanical shaft power at approximately 60 Hz. The cryocooler 16 is capable of fitting inside the torque tube 10, which may have an inside diameter of approximately 90 mm or less. The pulse-tube cryocooler 16 has no moving cryogenic parts near the cold end 30 of the cryocooler near the rotor 6.

One consideration for the design of the cryocooler 16, is the cryocooler 16 may be subject to high speed rotation because the cryocooler 16 is connected to, and thus rotates with the rotor 6. This rotation can physically change the effective axial stiffness of the linear electric motor 76 as the rotational speed increases. This may have the effect of changing the resonant frequency of the linear electric motor 76. This is important because the cryocooler 16 may operate while the linear electric motor 76 is both radially stationary and axially spinning (i.e. rotation) to maintain cryogenic temperatures for the superconducting rotor windings 28. This change in the linear electric motor 76 as a result of rotation with the rotor 6, may be accommodated by operating the cryocooler 16 at two different frequencies. In addition, under a direct drive connection to the low-pressure spool, the expected operating frequency may vary during various operating conditions and rejected operating conditions, and, therefore, the cryocooler 16 may be able to support a range of rotational speeds.

As depicted in FIGS. 1, 2, 8, and 9, the cryocooler 16 includes the cold tip or end 30, which is connected to the rotor 6 through the thermal bridge 18. The thermal bridge 18 may include a plurality of fingers 78 extending radially outward from a central hub 80, which hub 80 contacts the cold tip 30 of the cryocooler 16. The thermal bridge 18 may include a rotor terminal printed circuit board 120 that directly connects the fingers 78 to the rotor backiron 56 and contacts the fingers 78 and rotor backiron 56.

The cryocooler 16 may include a pulse tube 82, a piston rod 84 arranged on flexure bearings 86, a piston 88 arranged on the piston rod 84, and the linear electric motor 76 for moving the piston rod 84 in an axial direction of the piston rod 84 to thereby cause the piston 88 to produce acoustic vibrations in the pulse tube 82 and thus cool the cold tip 30. The flexure bearings 86 may be spiral flexures, which are flat plates with three or more spiral slots therein, thus yielding three or more spiral arms that extend between an outer radius of the plate and an inner radius of the plate. Two stacks of flexure bearings 86 may be arranged on either side of the piston rod 84 to provide radial support to, and allow linear movement of, the piston rod 84. The cryocooler 16 may also include a regenerator (not shown) which may be housed in a regenerator housing 126, an ambient heat exchanger 90, a cold heat exchanger 92, an inertance tube (not shown) which operates to provide flow inertance to reduce wave reflections and may be a coiled tube of approximately 6.5 mm diameter, a piston bore 96 for housing the piston 88, and a compression space 98 within the piston bore 96. The ambient heat exchanger 90 may include a copper plate with holes formed therethrough (e.g., approximately 2 mm diameter drilled holes), and may operate to provide heat transfer from helium gas (i.e., working fluid) in the cryocooler 16 to an outside of the cryocooler 16. The regenerator may have a porosity of approximately 77%, and including approximately 12 μm fiber, and allows helium gas to flow back and forth therethrough to provide bucket brigade heat pumping. The cold heat exchanger 92 includes a copper plate with holes formed therethrough (e.g., approximately 1.3 mm drilled holes), and may operate to provide heat transfer from outside the cryocooler 16 to the helium gas.

The linear electric motor 76 may include an inner iron 102 that is operatively connected to the piston rod 84 for moving the piston rod, a moving magnet 104 arranged around the inner iron 102, a coil 106 arranged around the moving magnet 104, and an outer iron 108 arranged around the coil 106. The piston rod 84 functions to provide bearing support to the piston 88 and magnet 104, and enables lubrication free axial translation within the linear electric motor 76. The inner iron 102 provides a flux path through the coil 106. The coil 106 converts electrical input to a magnetic field. The outer iron 108 provides a flux path around the coil 106.

The number of phases of the stator windings 38 may be determined based on the ability of the cryocooler 16 to lift a predetermined amount of heat loss from the rotor 6. In this regard, the number of phases chosen to be used for the stator windings 38 may produce a certain level of MMF harmonics in the rotor 6. These MMF harmonics may result in a certain amount of heat loss in the rotor 6. As such, the ability of the cryocooler 16 to lift heat losses from the rotor 6 may be used to determine the number of phases for the stator windings 38, where more phases in the stator windings 38 produces fewer MMF harmonics, and thus less heat loss in the rotor 6. Where the cryocooler 16 is able to lift a predetermined amount of heat loss of 50 W from the rotor 6 to cool the rotor windings to cryogenic temperatures, then the stator windings 38 may be multiphase stator windings 38 include more than three phases, e.g. having a nine-phase configuration, which may thereby limit the heat loss in the rotor 6 to be less than the predetermined amount of 50 W. By increasing the number of phases of the stator windings 38, the amount of MMF harmonics produced in the rotor 6 is limited, which thereby limits the amount of heat loss in the rotor 6. If this amount of heat loss in the rotor 6 is less than the amount that can be lifted by the cryocooler 16, then the cryocooler 16 will be able to operate to sufficiently cool the rotor windings 28 to cryogenic temperatures.

The torque tube 10 (see FIGS. 1-2) may be made of approximately 2 mm thick 316 stainless steel, and may operate to contain the cryocooler 16 and transfer torque from the rotor 6 to a mechanism external to the electric machine 2 via a connector rod 100. The connector rod 100 projects outside of the central shaft 12 and is configured to connect to a component outside of the electric machine 2 to thereby transfer power from the rotation of the torque tube 10 to the external component. The torque tube 10 may also function to contain the pressurized helium, limit axial heat transfer between the central shaft 12 and the rotor 6, maximize radial heat transfer from the ambient heat exchanger 90 to outside the torque tube 10, and is a framework for the cryocooler 16.

Exemplary non-limiting parameters for the cryocooler 16 are shown below in Table 5.

TABLE 5

Cryocooler Parameters

| Characteristic/parameter | Value |
|---|---|
| Frequency | 60 Hz |
| Gas | Helium |
| Pressure | 6.2 MPa |

TABLE 5-continued

Cryocooler Parameters

| Characteristic/parameter | Value |
|---|---|
| Heat lifted at 50K | 55 W |
| Heat rejected | 2000 W |
| Electrical in | 2000 W |
| Mechanical PVin | 1661 W |
| Coil current density | 4 A/mm$^2$ |
| Piston amplitude | 1.3 cm |

Other Components

As illustrated in the FIGS. 1-2, the electric machine 2 may further include motor mounts 110 and bushing 112 for mounting the electric machine 2 to a larger assembly, for example, an aircraft. The electric machine 2 may include a winding keepout 114 for housing the stator windings 38. The electric machine 2 may include a bearing housing 116 that houses one of the bearings 14 and rotatably connects the torque tube 10 to the central shaft 12 and stator 4. The electric machine 2 may include a vacuum enclosure flange 118 for closing off a rear of the vacuum enclosure 22 and in which the heat exchanger 32 is arranged. The heat exchanger 32 may be a finned heat exchanger that is cooled by surrounding ambient air. The heat exchanger 32 may be arranged on the central shaft 12 outside of the vacuum enclosure 22, which may allow heat rejection from the rotor 6 without a mechanical interface between the stationary and rotating parts of the electric machine 2. The electric machine 2 may include an inertance reservoir 122 for housing the inertance tube. The electric machine 2 may include an interface flange 124 for closing off a front of the vacuum enclosure 22.

It will be appreciated that various of the above-disclosed features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

| | Parts List |
|---|---|
| 2 | Electric machine |
| 4 | Stator |
| 6 | Rotor |
| 8 | Air gap |
| 10 | Torque tube |
| 12 | Central shaft |
| 13 | Shaft housing |
| 14 | Bearings |
| 16 | Cryocooler |
| 18 | Thermal bridge |
| 20 | Rotary transformer |
| 22 | Vacuum enclosure |
| 28 | Rotor windings |
| 30 | Cold tip/end |
| 32 | Heat exchanger |
| 34 | Stator teeth |
| 36 | Stator backiron |
| 38 | Stator windings |
| 40 | Stator winding slot |
| 42 | Base of teeth |
| 44 | Tips of teeth |
| 46 | Bores |
| 48 | Space |
| 50 | Cable |
| 52 | Insulation |
| 54 | Inner surface |
| 56 | Rotor backiron |
| 58 | Coils |
| 60 | Steel plates |
| 62 | Groove |
| 64 | Rotor winding fixture |
| 66 | Rotor teeth |
| 68 | Dovetail retainers |
| 70 | Slots |
| 72 | Walls |
| 74 | Ring retainer |
| 76 | Linear motor |
| 78 | Fingers |
| 80 | Central hub |
| 82 | Pulse tube |
| 84 | Piston rod |
| 86 | Flexure bearings |
| 88 | Piston |
| 90 | Ambient heat exchanger |
| 92 | Cold heat exchanger |
| 96 | Piston bore |
| 98 | Compression space |
| 100 | Connector rod |
| 102 | Inner iron |
| 104 | Moving magnet |
| 106 | Coil |
| 108 | Outer iron |
| 110 | Motor mounts |
| 112 | Bushings |
| 114 | Winding keepout |
| 116 | Bearing housing |
| 118 | Vacuum enclosure flange |
| 120 | Rotor terminal PCB |
| 122 | Inertance reservoir |
| 124 | Interface flange |
| 126 | Regenerator housing |
| | Circulation path |
| | Vacuum pump |
| | Eddy current/thermal shield |
| | Inertance tube |

The invention claimed is:

1. An electric machine including:
a stator;
a rotor including rotor windings;
an air gap arranged between the stator and the rotor and allowing rotation of the rotor with respect to the stator;
a cryocooler integrated with the rotor and adapted for co-rotation with the rotor;
a torque tube connected to the rotor for rotation with the rotor; and
a central shaft;
wherein a cold end of the cryocooler is in thermal contact with the rotor to cool the rotor windings to cryogenic temperatures to thereby make the rotor windings superconductive;
wherein the stator is not cryogenically cooled;
wherein the cryocooler is arranged inside the torque tube for rotation with the torque tube;
wherein the central shaft surrounds the torque tube and is connected to the torque tube through bearings such that the torque tube can rotate relative to the central shaft; and
wherein the central shaft is stationary with respect to the stator.

2. The electric machine according to claim 1, further including a thermal bridge interconnecting the cold end of the cryocooler and the rotor for providing the thermal contact between the cold end of the cryocooler and the rotor.

3. The electric machine according to claim 1, further including a vacuum enclosure surrounding the rotor and separating the stator from the rotor.

4. The electric machine according to claim 1, wherein:
the stator includes a stator backiron, teeth, and stator windings;
the teeth extend radially inward from the stator backiron toward the rotor and are spaced from one another to define stator winding slots;
the stator windings are arranged in each of the stator winding slots; and
the stator windings are not superconductive.

5. The electric machine according to claim 4, wherein:
the stator windings include a plurality of twisted conductive wires that define a cord, each of the conductive wires in the cord are electrically insulated from one another, and an outside of each cord is electrically insulated from the other cords;
a predetermined number of cords are arranged together to thereby define a cable, and each of the stator winding slots includes at least two cables; and
an outside of each cable is electrically insulated from the other cable.

6. The electric machine according to claim 4, wherein:
the stator backiron includes bores formed therein;
a space is defined in each of the stator winding slots between the stator windings and a vacuum enclosure surrounding the rotor; and
at least one of the bores is in fluid communication with the space in each of the stator winding slots to thereby define circulation paths configured to transport a fluid for cooling the stator windings.

7. The electric machine according to claim 1, wherein the cryocooler is a pulse-tube cryocooler including an integrated linear electric motor with flexure bearings and no moving cryogenic parts at the cold end of the cryocooler.

8. The electric machine according to claim 7, wherein:
the cryocooler is a single-stage cryocooler; and
the cryocooler includes a pulse tube, a piston rod arranged on the flexure bearings, a piston arranged on the piston rod, and the linear electric motor for moving the piston rod in an axial direction of the piston rod, wherein axial movement of the piston rod produces acoustic vibrations in the pulse tube.

9. The electric machine according to claim 1, wherein:
the rotor further includes a rotor backiron, and rotor teeth extending radially outward from the rotor backiron; and
wherein a thermal bridge interconnects the cold end of the cryocooler and the rotor backiron.

10. The electric machine according to claim 9, wherein:
each of the rotor windings are wound around one of the rotor teeth;
the rotor windings are each arranged in a groove of a rotor winding fixture; and
the rotor winding fixture is retained on the rotor backiron.

11. The electric machine according to claim 9, further including a rotary transformer or slip ring arranged on the torque tube, wherein the rotary transformer or slip ring is configured to transfer power to the rotor to energize the rotor windings.

12. The electric machine according to claim 1, wherein the electric machine is not cooled by a flow of cryogenic fluid through the rotor windings.

13. The electric machine according to claim 1, wherein the rotor further includes a rotor backiron, and the electric machine is not cooled by a flow of cryogenic fluid through the rotor windings or through the rotor backiron.

14. An electric machine including:
a stator including multiphase stator windings;
a rotor rotatable with respect to the stator and including rotor windings;
a cryocooler integrated with the rotor and adapted for co-rotation with the rotor;
a torque tube connected to the rotor for rotation with the rotor; and
a central shaft;
wherein the cryocooler is capable of lifting a predetermined amount of heat loss in the rotor so as to cool the rotor windings to cryogenic temperatures and make the rotor windings superconductive;
wherein the multiphase stator windings have more than three phases, and limit the heat loss in the rotor to be less than the predetermined amount of heat loss;
wherein the cryocooler is arranged inside the torque tube for rotation with the torque tube;
wherein the central shaft surrounds the torque tube and is connected to the torque tube through bearings such that the torque tube can rotate relative to the central shaft; and
wherein the central shaft is stationary with respect to the stator.

15. The electric machine according to claim 14, wherein:
the predetermined amount of heat loss in the rotor is approximately 50 W; and
the multiphase stator windings have a nine-phase configuration.

16. The electric machine according to claim 15, wherein:
the cryocooler is a single-stage pulse-tube cryocooler including an integrated linear machine with flexure bearings and no moving cryogenic parts at a cold end of the cryocooler;
the cryocooler includes a pulse tube, a piston rod arranged on the flexure bearings, a piston arranged on the piston rod, and the linear electric motor for moving the piston rod, wherein axial movement of the piston rod produces acoustic vibrations in the pulse tube to cool the cold end of the cryocooler.

17. The electric machine according to claim 14, further including a thermal bridge interconnecting a cold end of the cryocooler and the rotor for providing thermal contact between a cold end of the cryocooler and the rotor.

18. The electric machine according to claim 14, wherein the electric machine is not cooled by a flow of cryogenic fluid through the rotor windings.

19. The electric machine according to claim 14, wherein the rotor further includes a rotor backiron, and wherein the electric machine is not cooled by a flow of cryogenic fluid through the rotor windings or through the rotor backiron.

* * * * *